(12) United States Patent
Sebe

(10) Patent No.: US 6,511,078 B2
(45) Date of Patent: Jan. 28, 2003

(54) VEHICLE HAVING SUSPENSION SYSTEM WITH VARIABLE CAMBER AND VERTICAL SUSPENSION IN THE PLANE OF THE WHEEL

(75) Inventor: Marc Sebe, Marly (CH)

(73) Assignee: Conception et Developpement Michelin S.A. (CH)

( * ) Notice: Subject to any disclaimer, the term of this patent is extended or adjusted under 35 U.S.C. 154(b) by 93 days.

(21) Appl. No.: 09/829,058

(22) Filed: Apr. 9, 2001

(65) Prior Publication Data

US 2001/0028154 A1 Oct. 11, 2001

(30) Foreign Application Priority Data

Apr. 10, 2000 (FR) .............................. 00 04596

(51) Int. Cl.⁷ .................. B60G 3/01; B60G 17/01; B62D 9/02; B62D 17/00
(52) U.S. Cl. ................. 280/5.509; 280/5.521; 280/124.103; 280/124.127
(58) Field of Search ................. 280/5.521, 5.52, 280/5.508, 5.509, 124.103, 124.112, 124.127, 124.126, 86.757, 86.751

(56) References Cited

U.S. PATENT DOCUMENTS

| | | | | |
|---|---|---|---|---|
| 2,152,938 A | * | 4/1939 | Welch | 280/124.103 |
| 3,485,506 A | * | 12/1969 | Meibar et al. | 280/5.521 |
| 4,159,128 A | * | 6/1979 | Blaine | 280/5.521 |
| 4,487,429 A | * | 12/1984 | Ruggles | 280/5.521 |
| 4,700,972 A | | 10/1987 | Young | |
| 4,796,720 A | | 1/1989 | Bauer | |
| 6,113,119 A | | 9/2000 | Laurent et al. | 280/124.1 |
| 6,170,838 B1 | | 1/2001 | Laurent et al. | 280/5.508 |

FOREIGN PATENT DOCUMENTS

| | | |
|---|---|---|
| DE | 1214100 | 4/1966 |
| DE | 2822058 | 11/1979 |
| EP | 0878332 | 11/1998 |
| EP | 0878378 | 11/1998 |
| FR | 967710 | 11/1950 |
| JP | 63101114 | 5/1988 |
| WO | 8702951 | 5/1987 |

* cited by examiner

Primary Examiner—Peter C. English
(74) Attorney, Agent, or Firm—Baker Botts LLP

(57) ABSTRACT

A ground contact system for a vehicle having a wheel mounted on a wheel carrier, the wheel carrier being mounted on a support by a vertical suspension device, the support being mounted on a chassis by a load transfer arm on one side of which the support is articulated along an essentially horizontal geometrical camber axis, the load transfer arm being connected at its other side to the chassis along an essentially vertical geometrical axis, a camber control rod being pivotally mounted to the support some distance from the geometrical camber axis, the camber control rod being able to move transversely relative to the chassis, a triangulation-forming element connecting the load transfer arm to the chassis around the essentially vertical geometrical axis, such that it controls the moment about the essentially vertical geometrical axis.

10 Claims, 5 Drawing Sheets

Fig: 3

VEHICLE HAVING SUSPENSION SYSTEM WITH VARIABLE CAMBER AND VERTICAL SUSPENSION IN THE PLANE OF THE WHEEL

BACKGROUND OF THE INVENTION

The present invention concerns a suspension system for vehicles, in particular road vehicles. It concerns both the guiding of a vehicle wheel relative to the body of the vehicle, and the organisation of the suspension clearance movements of the wheel relative to the chassis. It relates more particularly to means used to control the position of the plane of the wheel, both in relation to the camber relative to the ground and in relation to the horizontal and vertical suspension movements relative to the body.

Control of the suspension clearance movements amounts to saying that the guiding must ensure a rigorously controlled position of the plane of the wheel relative to the chassis. In general, it is easy to define a longitudinal and vertical plane of symmetry on a vehicle. Let it be understood herein that the plane of symmetry serves as a reference plane related to the chassis. The guiding of the wheel plane aims to control as rigorously as possible the relative position of the wheel plane in relation to the chassis. It should be remembered that the "plane" of a wheel is the plane perpendicular to the rotation axis of the wheel, passing through the center of the ground contact area of a tire or an elastic hoop fitted on the wheel. It is convenient to use the term "vertical suspension" for the clearance travel of the wheel vertically relative to the chassis. It is desirable to allow at least a slight movement in the longitudinal direction, and this is spoken of as the "horizontal suspension". The term "camber" designates the angle $\gamma$ formed by the wheel plane relative to a line perpendicular to the ground. The term "steering" is the rotation of the wheel plane about a perpendicular line extending upwards from the center of the tire's ground contact area. Finally, "roll" is the inclination of the vehicle body about a horizontal axis lying in the plane of symmetry (angle $\rho$).

The guiding of the wheel plane directly determines the position of the tire on the ground and hence also the stresses imposed on the tire and whether it is located in a more or less favourable position for the transmission of forces, in particular transverse forces. These forces are of prime importance for the handling of the vehicle, and therefore for safety.

The road vehicles in use now a days are known to undergo a rolling movement by virtue of their suspension. In effect, centrifugal force results in a load transfer towards the outside of the bend, whose consequence is that the suspensions on the side towards the outside of the bend are compressed more and those on the side towards the inside of the bend are relaxed, whence the roll. Owing to the increased camber of the wheel that it induces, this roll has an adverse effect both on passenger comfort and on the vehicle's road-holding. The means most commonly used to combat roll is to use one or more anti-roll bars. Unfortunately, an anti-roll bar can only limit the roll by opposing it with a reaction moment. In principle it cannot prevent the onset of roll, and cannot therefore prevent the wheels from inclining in a direction unfavourable for proper operation of the tires.

SUMMARY OF THE INVENTION

The purpose of the invention is to provide a high level of vehicle operation safely and great comfort by means of suspension kinematics that enable simultaneous active control of the wheel's camber and of the vertical suspension.

From U.S. Pat. No. 6,170,838 a proposal is already known, which describes a camber mechanism which, when viewed in a vertical plane perpendicular to the longitudinal axis of the vehicle, forms a parallelogram, combined with a horizontal suspension mechanism which also forms a parallelogram, this time when viewed in a horizontal plane. This enables extremely rigorous control of the wheel plane. However, the arrangement is fairly bulky, especially in its width.

The aim of the present invention is to provide a more compact arrangement which gives the same degrees of freedom of movement (and their rigorous control) of the wheel plane relative to the ground and relative to the chassis, while leaving more room available between the suspension mechanisms, in particular for the accommodation of the mechanical equipment and/or the passenger compartment.

The invention proposes a vehicle comprising:

a rolling and suspended chassis, at least two ground contact systems, each comprising a wheel, the ground contact systems being mounted on the chassis transversely on either side thereof, the wheel of each ground contact system being mounted on a wheel carrier, the wheel carrier being mounted on a support by a vertical suspension device that ensures the vertical suspension travel movement of the wheel carrier relative to the support, the suspension travel movement taking place in the plane of the wheel and the suspension travel movement being sufficient to produce the required vertical suspension movement, the travel movement being controlled by appropriate means, each support being mounted on the chassis in a manner enabling the plane of each wheel to be inclined relative to the chassis so as to impose on the planes of the wheels a camber angle $\gamma$ of a desired amplitude by inclining the wheels relative to the ground all on the same side, characterised in that the support is mounted on the chassis by a load transfer arm on one side of which the support is articulated along an essentially horizontal geometrical camber axis, the load transfer arm being connected on its other side to the chassis along an essentially vertical geometrical axis, a camber control rod being pivotally mounted on the support at some distance from the geometrical camber axis, the camber control rod being able to move transversely relative to the chassis, a triangulation-forming element connecting the load transfer arm such that it controls the moment about the essentially vertical geometrical axis.

The expression "ground contact system" designates the totality of elements between the ground and the body or chassis of a vehicle. The invention proposes a suspension kinematic system as pure and complete as possible: the ground contact system provides not only vertical suspension, but also enables the camber of the wheel to be modified at any time but without reducing the vertical suspension path either on compression or on relaxation, while maintaining the vertical suspension in optimum operating condition in particular because control of the camber angle makes it possible to reduce the moments and shear stresses due to centrifugal force that appear in the vertical suspension while the vehicle is subjected to centrifugal forces. Of course, one cannot act directly upon the camber of a wheel relative to the ground; this is done indirectly, via a mechanism associated with the vehicle's chassis.

According to a design variant, the invention proposes a vehicle with active roll control: the vehicle's passenger compartment is mounted on the chassis such that it can incline towards the inside of a turn as a function of the centrifugal force. The passenger compartment is subjected to a roll which is more natural and better tolerated by the occupants of the vehicle, similar to conveyances with two aligned wheels (for example a motorcycle). It should be noted that although the roll is a phenomenon of the passenger compartment's position relative to the ground, the roll angle is acted upon indirectly by acting between the chassis and the passenger compartment of the vehicle. The aim is to achieve a substantial variation range of the passenger compartment's roll angle, of the same order of magnitude as the variation range of the camber. In that way, without necessarily reaching the roll angles that can be adopted by a vehicle with two aligned wheels, the effect produced is sufficiently perceptible to modify radically the impressions felt by the vehicle's passengers and so to contribute to their comfort.

The invention will be better understood from the description below, relating to a vehicle with four wheels. The invention applies particularly to vehicles comprising at least four wheels, though the example given is not limiting.

DETAILED DESCRIPTION OF THE INVENTION

Figure 1:
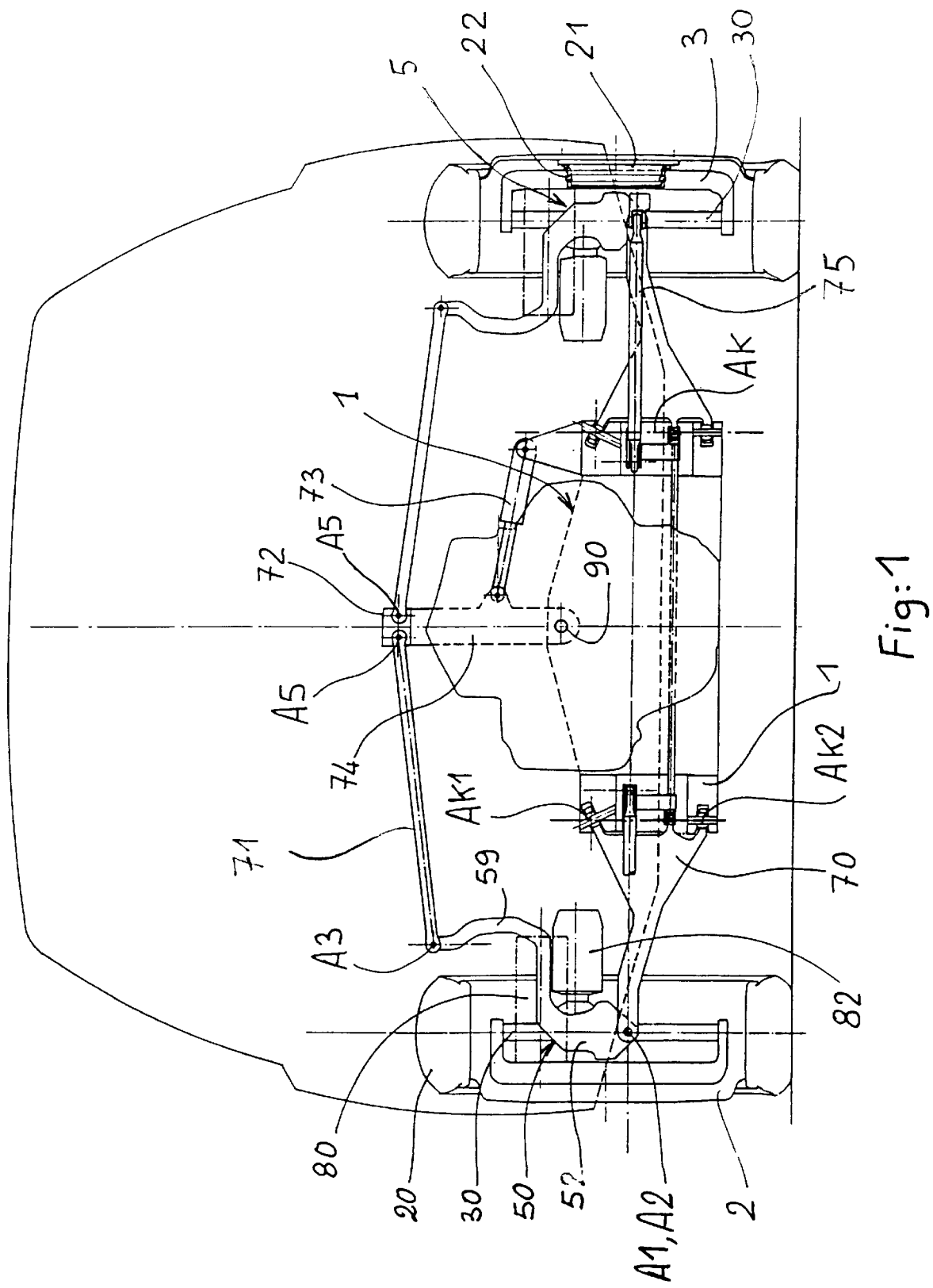
FIG. 1 is a schematic front view showing the main elements of two ground contact systems fitted on a vehicle.

FIG. 1 shows in particular a chassis 1 consisting of a central beam to which all the vehicle's elements are attached. Preferably, each ground contact system of the vehicle is identical. Accordingly, four wheels 2 are mounted on the chassis 1 by means of identical elements, so that it suffices to describe only one of the ground contact systems for a complete description of the invention. It can be seen that to each wheel is fitted a tire 20 whose profile seen in radial cross-section is reminiscent of that of automobile tires because the tire has to run at camber angles very different from zero degrees. The wheel 2 is mounted on a wheel carrier 3 (the "wheel carrier" is the portion that does not rotate) via a shaft 21 and a bearing 22, indicated schematically on the right of FIG. 1.

The wheel carrier 3 faithfully follows all the movements of the wheel 2 (except of course for the wheel's rotation about its rotation axis). The wheel carrier 3 is mounted on a support 5, such that the clearance desired for the vertical suspension is present between the support 5 and the wheel carrier 3. The wheel carrier 3 is mounted on the support 5 by means of a single bar 30 which slides in the support and is guided by it. The wheel carrier is immobilised on the bar 30 at the two ends of the latter. The bar 30 is arranged within the volume radially delimited by the rim of the wheel 2. The suspension clearance travel of a wheel in this case takes place parallel to the plane of the wheel. The wheel's clearance travel can be controlled, for example, by a spiral spring 81 (see FIG. 2) and a damper fitted inside the spring (not shown, to avoid overcomplicating the drawing). Another solution will be described in greater detail below.

The points where the support 5 is mounted on the vehicle are three in number: an upper point A3 at the end of a lug 59, and two lower points A1, A2 that form a geometrical camber axis AA (visible in particular on the left of FIG. 1, where certain other elements are not shown in order to make the mounting of the support 5 more clearly apparent). The support 5 can therefore be held rigorously in position (maintenance of the wheel plane) by these three points. The support 5 is connected to the chassis 1 of the vehicle by a load transfer arm 70 mounted at the two lower points A1 and A2, and by a camber control rod 71. This allows a degree of freedom for the support 5 to tilt about the geometrical camber axis AA. Under the action of means for controlling the camber, the control rod 71 is moved transversely relative to the chassis 1 to vary the position of the point A3 relative to the position of the geometrical camber axis AA, and this enables the value of the camber of the wheel 2 to be changed.

Steering of the wheel 2 is enabled by a pivot 50 preferably integrated in the support 5. For that purpose and in this particular embodiment, the support 5 comprises a first element 51 for guiding the wheel 2 and a second mounting element 52 on which are arranged the three points A1, A2 and A3 for mounting the support 5 on the vehicle. The bar 30 slides within the first element 51, which procures the vertical suspension movement, but cannot turn about its geometrical axis independently of the first element 51. The first element 51 is mounted in the second element 52 by bearings 53 centerd on the axis of the bar 30, and no translation of the first element 51 relative to the second element 52 parallel to the geometrical axis of the bar 30 is possible. The first and second elements 51, 52 thus form a pivot 50. The lug 59 extends the second element 52 and ends at the point A3 controlling the camber of the wheel 2. A lever 58 extends the second element 52 and ends at a point A4 controlling the steering of the wheel 2. The steering angle is controlled by a track rod 75 which can be seen in particular in FIG. 2 and on the right in FIG. 1.

The ends (on the camber control actuator side) of the camber control rods 71 of the wheels on a given axle (that is, the wheels 2 on either side of the chassis 1 opposite one another) are essentially united at the center of the vehicle where each is mounted at a point A5 on the same plate 72. The plate 72 is arranged at the end of a central lever 74 articulated to the chassis 1 at a point located on a roll axis 90, about which more will be said later in the description. The transverse movement of the plate 72 relative to the chassis 1 is controlled by a camber control jack 73, which is irreversible or braked and whose length is adjusted appropriately. Of course, by virtue of the central control the wheels 2 incline towards the same side, i.e. non-symmetrically relative to the chassis.

Figure 3:
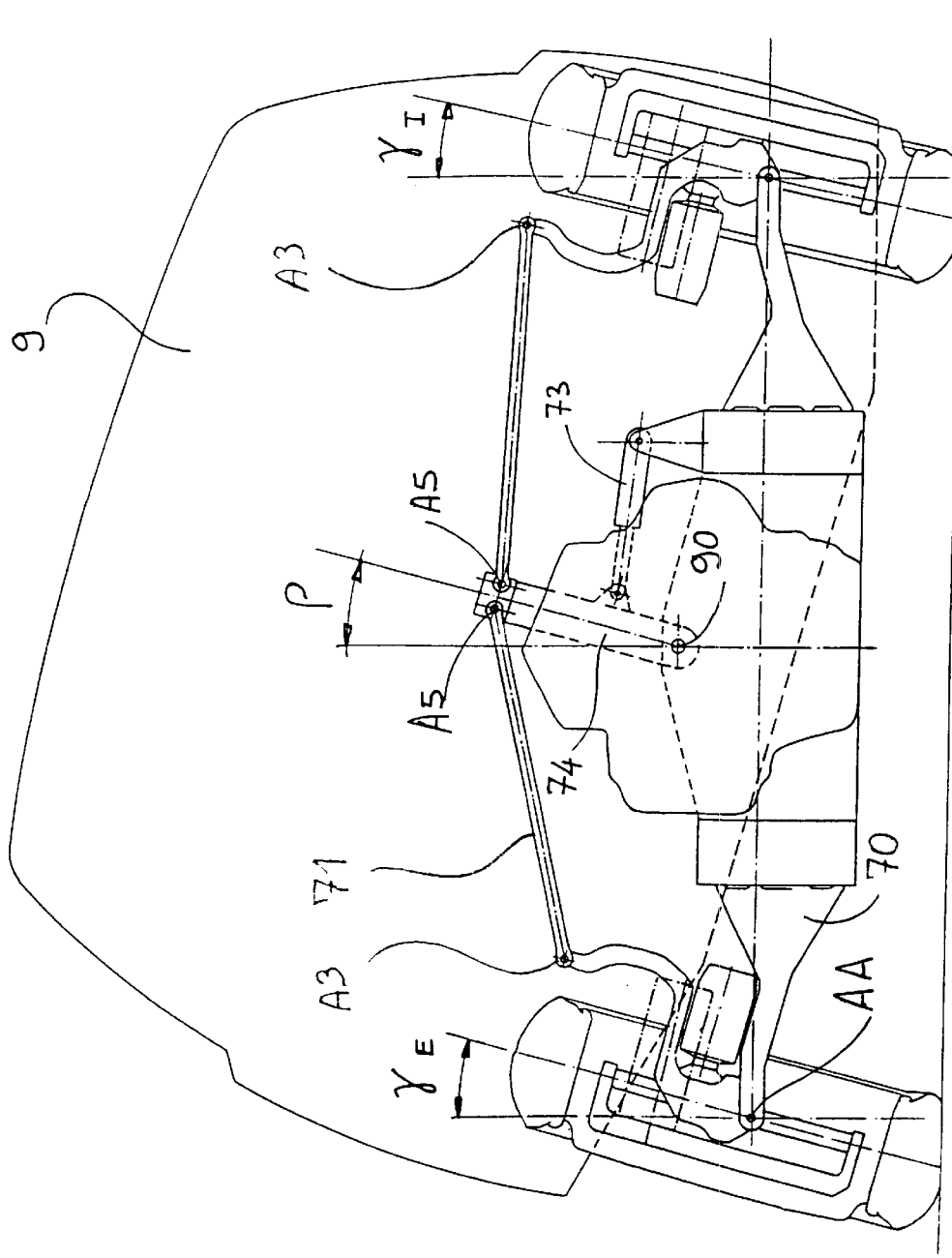
FIG. 3 is a schematic front view showing a camber variation.

Inspection of FIGS. 1 and 3 clearly shows the four points that determine the geometrical characteristics of the control system for the camber angle of the wheels 2, namely the point that locates the geometrical camber axis AA, the point that locates the roll axis 90, and the points A3 and A5. In this embodiment the four points form a figure which approximates a parallelogram. Owing to the imperfection of this parallelogram, the resulting camber angles are different on the left and on the right. For an angle of value ρ imposed on the central lever 74 by the camber control jack 73, the camber angle $\gamma_E$ on the side outside the bend is larger than the value ρ and the camber angle $\gamma_I$ on the side inside the bend is smaller than the value ρ. Consequently, the wheelbase of the vehicle is made appreciably wider, which favours stability. Moreover, bearing in mind that the loads transferred to the wheels when rounding a bend are themselves very asymmetrical, the wheels on the outside of the bend being overloaded, such a simplified camber control system gives every satisfaction.

Figure 4:
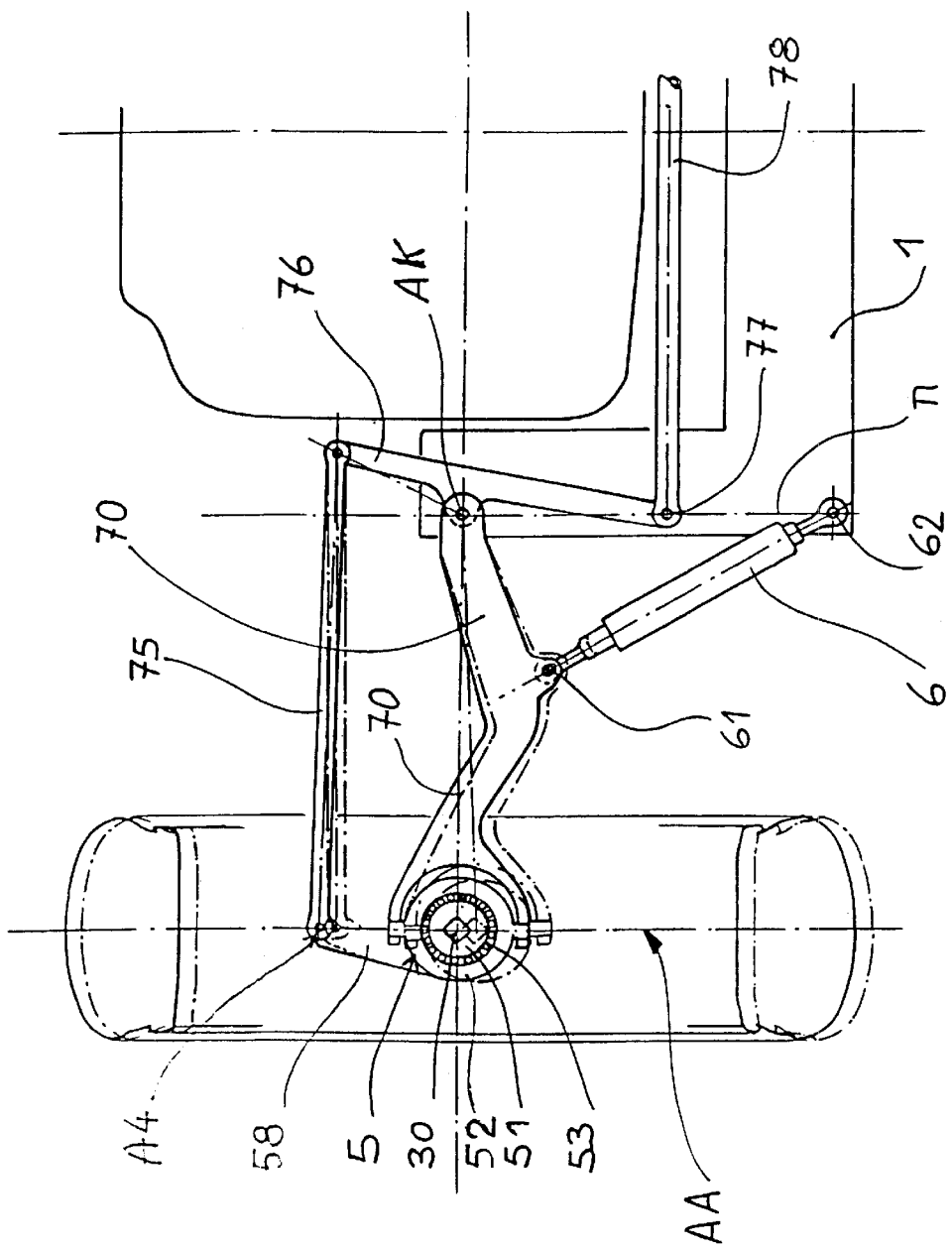
FIG. 4 is a plan view showing a horizontal suspension clearance.

In particular it can be seen from FIGS. 1 and 4 that the load transfer arm 70, on the side of the chassis 1, is mounted along an essentially vertical geometrical axis AK. There are two attachment points AK1 and AK2, which are superposed and a distance apart from one another. The load transfer arm 70 cannot turn in the vertical plane (FIGS. 1 and 3). Accordingly, the load supported by the chassis 1 is transferred in its entirety to the combination of the load transfer arms 70. In the horizontal plane (FIGS. 2 and 4) the moment about the essentially vertical geometrical axis AK due to the horizontal stresses derived from the propulsion and/or braking forces and/or the shocks imposed on the wheel, must be absorbed. The load transfer arm 70 should preferably be supported on the chassis 1 at a point some distance from the essentially vertical geometrical axis AK. To that end, a triangulation-forming element 6 is mounted on the one hand on the load transfer arm 70 at a point 61 intermediate between its ends, and on the other hand on the chassis at a point 62 remote from the essentially vertical geometrical axis AK of the load transfer arm 70.

The invention lends itself advantageously to the incorporation of horizontal suspension. For example, the load transfer arm 70 can be mounted at the superposed attachment points AK1 and AK2 in such a way that it can turn fairly freely about the essentially vertical geometrical axis AK, which procures a certain freedom of longitudinal movement for the support 5 and therefore for the wheel 2. The triangulation-forming element 6 is used to control the horizontal suspension travel clearance of the load transfer arm 70. The triangulation-forming element 6 is an element which has a certain elasticity that permits (but in a controlled way) an oscillation of the load transfer arm 70 about the essentially vertical geometrical axis AK. It comprises means to procure a spring function, and means to procure a damping function. As is known, a correctly formulated rubber element can procure those functions.

The simplified camber mechanism proposed can accommodate horizontal suspension movements while introducing only imperceptible camber variations.

Figure 2:
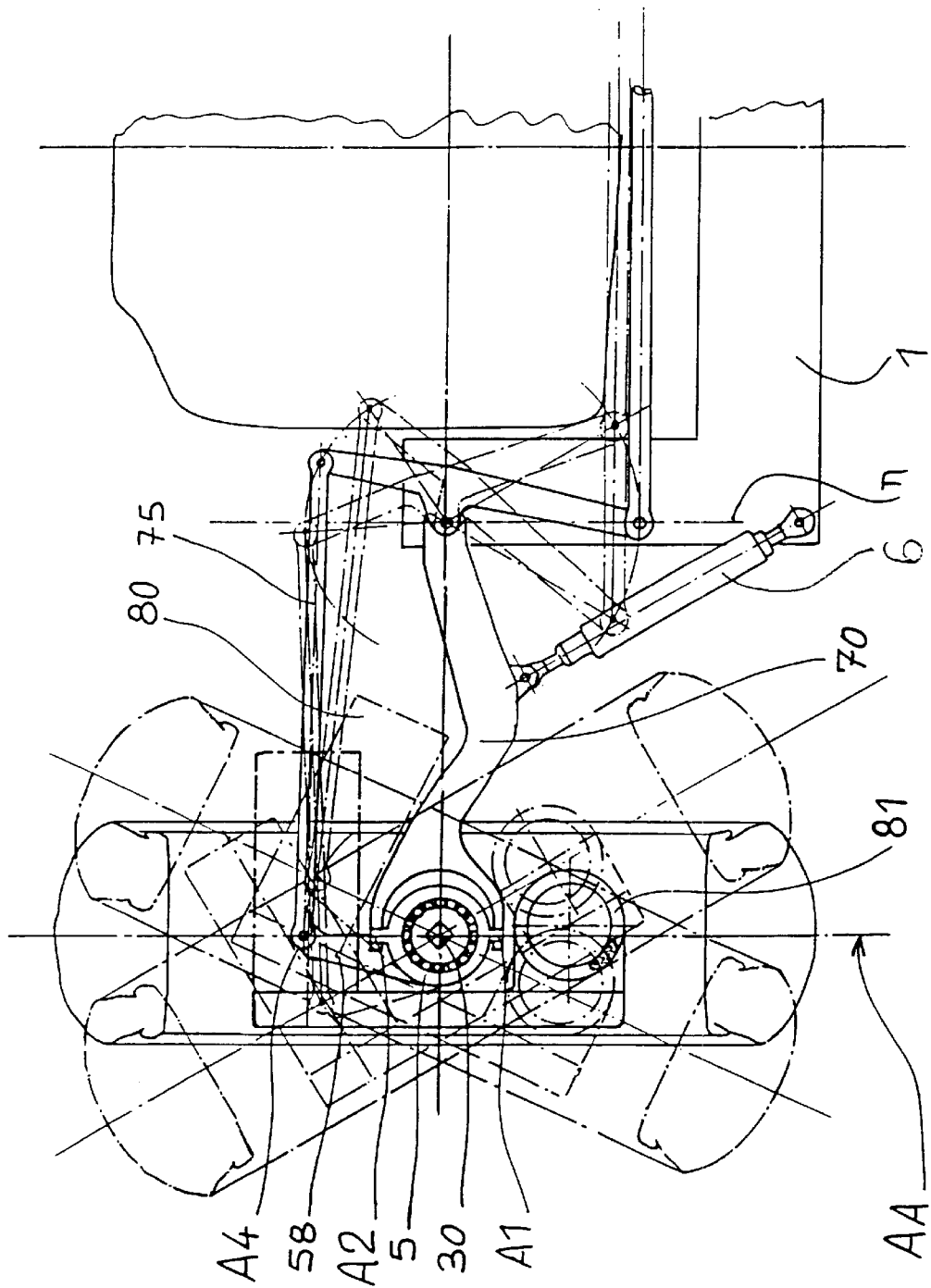
FIG. 2 is a plan view showing a ground contact system according to the invention.

The steering control system will now be explained. FIG. 2 shows that when viewed in a horizontal plane, the track rod 75 forms a trapezium with the load transfer arm 70. The length of the track rod 75 is greater than the length of the load transfer arm 70. Besides, the track rod 75 is actuated by a direction control lever 76 mounted articulated on the essentially vertical geometrical axis AK of the load transfer arm 70. The end 77 of the lever 76 terminates in the longitudinal plane π containing the essentially vertical geometrical axis AK. The steering control from one direction abutment to the other, by a steering bar 78, causes the end 77 of the lever 76 to describe a symmetrical movement relative to the said longitudinal plane π. It is this arrangement that provides control in accordance with the principle of the Jeantaud (Ackerman) working design.

It should be stressed that the adoption of a ground contact system offering camber that can be varied over a wide range, goes particularly well with the use of a traction system by electric motors implanted in the wheels. It is then necessary for the mechanical elements to leave enough room for these traction motors. The preferred embodiment illustrating the invention also adopts the implantation of an electric traction motor 80 already described in U.S. Pat. No. 6,113,119. The control of the vertical suspension movement can also adopt the implantation proposed in the same U.S. patent. That is what is shown in the drawings. There is a rack bar (machined into the bar 30) whose movement is controlled by a suspension electric motor 82. The suspension electric motor 82 remains vertically immobile whatever the deflection of the vertical suspension, and it follows the movements of the wheel plane in terms of both steering and camber.

FIG. 2 shows (using broken lines) the position of the traction motor 80 with the wheel tracked inwards as far as its abutment on the right. This is the position shown by the number "80". It can be seen that the load transfer arm 70 is curved so as to leave the necessary space, granted the fact that the traction motor 80 follows the steering movements of the wheel plane and the vertical suspension clearance movements of the wheel. FIG. 3 shows for each of the wheels 2 the position of the suspension motor 82 when the wheels 2 are at the extremes of their camber. It can be seen in FIGS. 2 and 4 that load transfer arm 70 is shaped so as to leave the necessary space, granted the fact that the traction motor 80 follows the movements of the wheel plane in terms of steering, camber and suspension clearance. It can be seen in FIGS. 1 and 3 that the load transfer arm 70 and the lug 59 are shaped so as to leave the necessary space, granted the fact that the suspension motor 82 follows the steering and camber movements of the wheel plane.

Preferably, the steering mechanism should make the steering angle of the wheels sufficiently insensitive to camber variations and to horizontal suspension movements (or body roll variations if this is controlled actively, as proposed below).

On a non-steering axle a simplified ground contact system can be used, which does not permit steering of the wheel. For example, the support 5 is monoblock and the triangulation-forming element 6 is then preferably rigid. The wheel plane is kept tracked by the fact that the points A1 and A2 that define the geometrical camber axis AA are far enough apart and are connected to the same mechanical component, namely the load transfer arm 70.

On a non-steering axle it is also possible to use a support 5 with two elements 51 and 52 as described earlier and to immobilise the wheel carrier by connecting a rod appropriately on the one hand to the lever 58 of the first element 51 and on the other hand to the chassis 1. If the support 5 moves back relative to the chassis 1, the second element undergoes a slight rotation which is automatically compensated by a slight steering of the first element 51 into the second element 52. This prevents the appearance of an induced steering, induced by displacement of the support along the horizontal suspension path.

As for the vehicle's passenger compartment, this will either be attached firmly to the chassis 1 or mounted on the chassis 1 like the passenger compartment 9 of the vehicle drawn to illustrate the invention. The roll axis 90 mentioned earlier is an essentially horizontal longitudinal axis. In the latter case the vehicle is such as to comprise:

a passenger compartment 9 for the transport of passengers, mounted on the chassis 1 and able to tilt about an essentially longitudinal roll axis 90, such that the compartment adopts a variable roll angle relative to the chassis 1, means for controlling the roll, interposed between the chassis 1 and the passenger compartment, which act so as to impose the roll angle in the same direction as the camber imposed on the wheels.

Preferably, the roll control means consist essentially of the camber control jack 73, such that the camber variation of the wheels 2 and the variation of the passenger compartment roll angle are synchronous.

By attaching the passenger compartment firmly to the camber control lever 74, the compartment adopts a roll angle ρ in the opposite direction to the direction usual for touring vehicles. This contributes to passenger comfort, including a perception of greater safety. It should be noted that this in itself also contributes to safety by shifting the vehicle's center of gravity towards the inside of the bend, which reduces the load fraction transferred to the wheels on the outside of the bend. Not only do the tires then operate in a more favourable position relative to the ground, but in addition, in this embodiment the momentary overload of the tires on the outside of the bend is less than if there were no camber correction. The tires on the inside are less underloaded, and their ability to develop deviation thrusts is better preserved.

Figure 5:
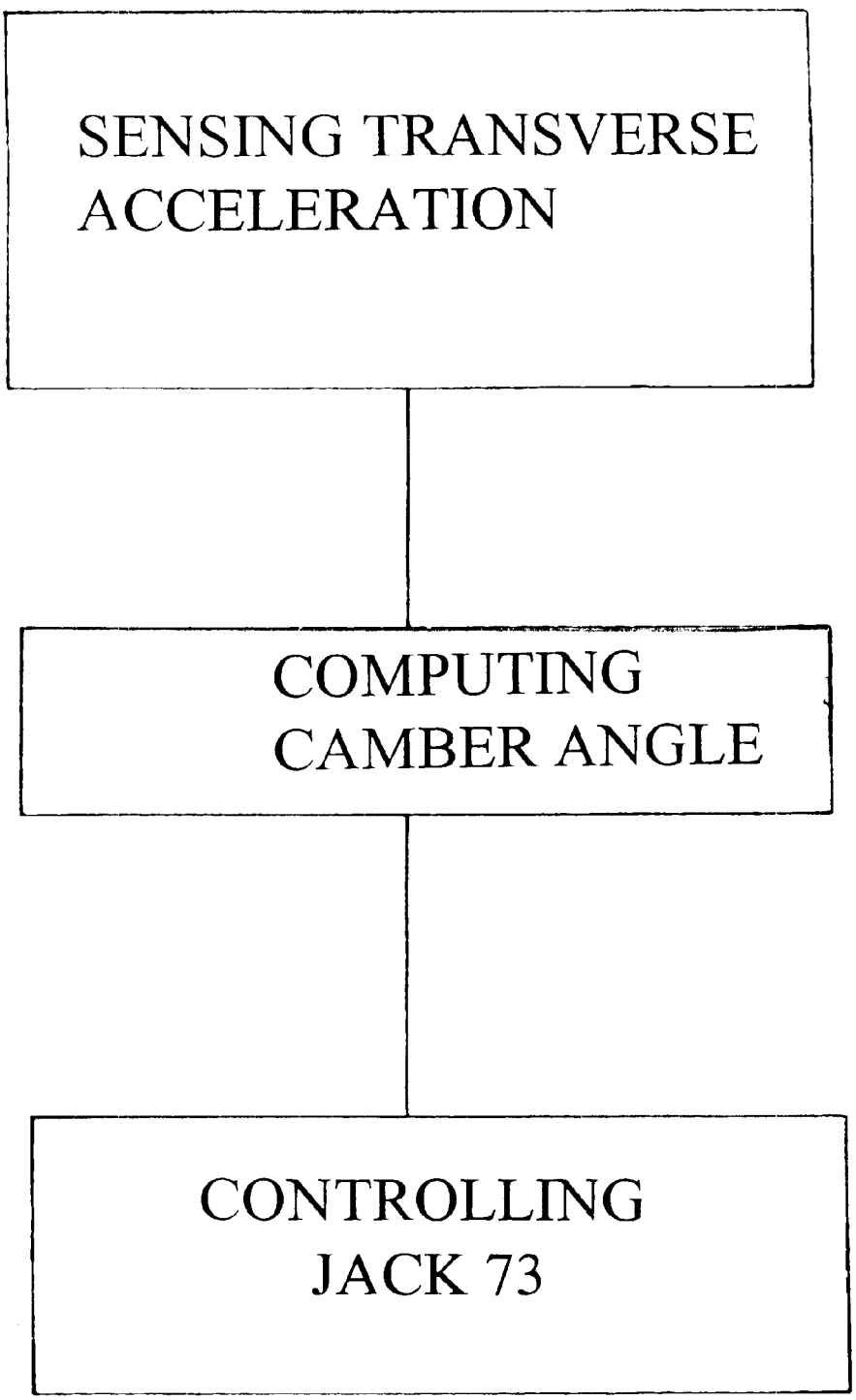
FIG. 5 is a schematic of the camber control process.

To control the camber angle or passenger compartment roll angle as a function of the centrifugal force acting on the vehicle, at least one sensor can be fitted on the vehicle to detect the value of at least one parameter that enables the transverse acceleration acting on the vehicle to be evaluated, together with computation means to calculate the amplitude of the camber angle as a function of the value(s) measured. The camber angle can be controlled individually, wheel by wheel, or collectively for all the wheels or for the wheels on a given axle. See FIG. 5.

This may entail direct measurement of the centrifugal acceleration or an evaluation as a function of indirect parameters such as the vehicle's speed and the steering-wheel angle. In all cases, computation means (for example, a microprocessor loaded with the appropriate program) enable the implementation of regulation strategies similar to those for the control of active suspension systems, in order to calculate the roll angle to be imposed. Such a strategy can take account of various control laws, as for example a proportionality value that establishes the level of transverse acceleration at which the maximum roll angle permitted by the roll mechanism is reached.

On the basis of what has been said, those with knowledge of the field will be able to make adaptations to suit their wishes without going beyond the scope of the present invention. For example, there is no reason why a filter cannot be added between the passenger compartment and the chassis, perhaps in the form of elastic support blocks made of rubber. The pivot could of course be constructed differently. The pivot axis could be not in the plane of the wheel, or if it is in the wheel plane, it could be inclined (to produce a non-zero angle of play), depending on numerous design variants.

The invention is particularly applicable to four-wheeled vehicles such as passenger cars. Now, the camber angle variation concerned here is wide, that is to say, closer to the values currently typical of motorcycles than to the control values that can exist in a classical touring vehicle with four wheels. To be more specific, the variation range is of the order of ±15° to ±20°. In any case, the variation range is such that when the wheel tilts around its area of contact with the ground, the transverse movement of the radially upper portion of the wheel may reach an amplitude larger than the width of the wheel.

I claim:

1. A vehicle comprising:
   a rolling and suspended chassis,
   at least two ground contact systems each comprising a wheel, said ground contact systems being mounted on said chassis transversely on either side thereof, the wheel of each ground contact system being mounted on a wheel carrier, the wheel carrier being mounted on a support by a vertical suspension device that permits suspension travel movement of the wheel carrier relative to the support, the suspension travel movement taking place in the plane of the wheel, the suspension travel movement being sufficient to permit the vertical suspension movement required, and
   each support being mounted on said chassis in a manner that makes it possible to incline each wheel relative to said chassis in order to impose on the planes of said wheels a camber angle of the desired amplitude, by inclining the wheels relative to the ground,
   each support being mounted on said chassis by a load transfer arm, at one end of which the support is articulated along an essentially horizontal geometrical camber axis, said load transfer arm being connected at its other end directly to the chassis along an essentially vertical geometrical axis,
   a camber control rod being pivotally mounted to each support at a location spaced away from the geometrical camber axis, the camber control rod being able to move transversely relative to the chassis, and
   a triangulation-forming element connecting each load transfer arm to the chassis, such that it controls moments about the essentially vertical geometrical axis.

2. A vehicle according to claim 1, wherein each support comprises a first element that guides the respective wheel and a second element on which the respective load transfer arm is mounted, the first and second elements together forming a pivot that defines a geometrical pivot axis which enables the respective wheel to be steered relative to the chassis, the steering angle being controlled by a track rod.

3. A vehicle according to claim 2 in which, viewed in a horizontal plane, each track rod forms a trapezium with the respective load transfer arm.

4. A vehicle according to claim 2 in which each track rod is actuated by a direction control lever pivotally mounted along the essentially vertical geometrical axis of the respective load transfer arm.

5. A vehicle according to claim 1 in which each triangulation-forming element controls a horizontal suspension travel of the respective load transfer arm and is mounted at one end to the respective load transfer arm at a point between its ends, and at another end to the chassis at a point some distance away from the essentially vertical geometrical axis of the respective load transfer arm.

6. A vehicle according to claim 1 in which each triangulation-forming element is an element that permits an oscillation movement of the respective load transfer arm about the essentially vertical geometrical axis, such that a horizontal suspension is obtained.

7. A vehicle according to claim 1 in which inner ends of the camber control rods are essentially united at the center of the vehicle, where each is mounted to the same plate whose transverse movement relative to the chassis is controlled by a camber control jack.

8. A vehicle according to claim 1, comprising:
   a passenger compartment for the transport of passengers, mounted on the chassis and able to tilt about an essentially longitudinal roll axis, such that the passenger compartment can move through a variable roll angle relative to said chassis, and means for controlling the roll interposed between the chassis and the passenger compartment, which act so as to impose said roll angle in the same direction as the camber imposed on the wheels.

9. A vehicle according to claim 8 in which inner ends of the camber control rods are essentially united at the center of the vehicle, where each is mounted to a common plate whose transverse movement relative to the chassis is controlled by a camber control jack, and in which the roll control means comprise the camber control jack, such that the variation of the camber of the wheels and the variation of the roll angle of the passenger compartment are synchronous.

10. A vehicle according to claim 1, comprising at least one sensor to detect the value of at least one parameter that enables evaluation of the transverse acceleration acting on the vehicle, and computation means for calculating the amplitude of the camber angle as a function of the at least one value detected.

* * * * *

UNITED STATES PATENT AND TRADEMARK OFFICE
CERTIFICATE OF CORRECTION

PATENT NO.    : 6,511,078 B2
DATED         : January 28, 2003
INVENTOR(S)   : Sebe, Marc It is certified that error appears in the above-identified patent and that said Letters Patent is hereby corrected as shown below:

Column 4,
Line 26, "centerd" should read -- centered --

Column 6,
Line 33, "monoblock" should read -- monobloc --

Column 8,
Line 9, "and" should be deleted
Line 29, "moments" should read -- movements --

Signed and Sealed this

Sixth Day of May, 2003

JAMES E. ROGAN
*Director of the United States Patent and Trademark Office*